(No Model.)

O. P. HILL.
RAT TRAP.

No. 590,646. Patented Sept. 28, 1897.

WITNESSES:

INVENTOR
Oley P. Hill.
BY John G. Manahan,
ATTORNEY.

UNITED STATES PATENT OFFICE.

OLEY P. HILL, OF CAPRON, ILLINOIS.

RAT-TRAP.

SPECIFICATION forming part of Letters Patent No. 590,646, dated September 28, 1897.

Application filed July 13, 1897. Serial No. 644,398. (No model.)

*To all whom it may concern:*

Be it known that I, OLEY P. HILL, a citizen of the United States, residing at Capron, in the county of Boone and State of Illinois, have invented certain new and useful Improvements in Rat-Traps; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention has reference to improvements in rat-traps; and it consists of certain appliances, hereinafter described, to permit the rats to voluntarily enter the receptacle which constitutes the trap and precludes them from escaping after being once fully within the trap-chamber. It is well-known to those familiar with the habits of rats and their disposition that such animals are both timid and venturesome. They seem to have a curiosity which leads them to explore every opening which they can enter. On the other hand, they are easily alarmed with the slightest noise, and therefore it is desirable that the operation of the trap should be as noiseless as possible.

In my invention it is the intention to avail oneself of the peculiarity of these animals in crawling through openings, to furnish an ultimate receptacle which will contain any desired number of them, and to wholly dispense with any noise about the trap which would be likely to alarm or drive away the rats before they had fully entered the same. I attain these results by the construction illustrated in the accompanying drawings, in which—

Figure 1:
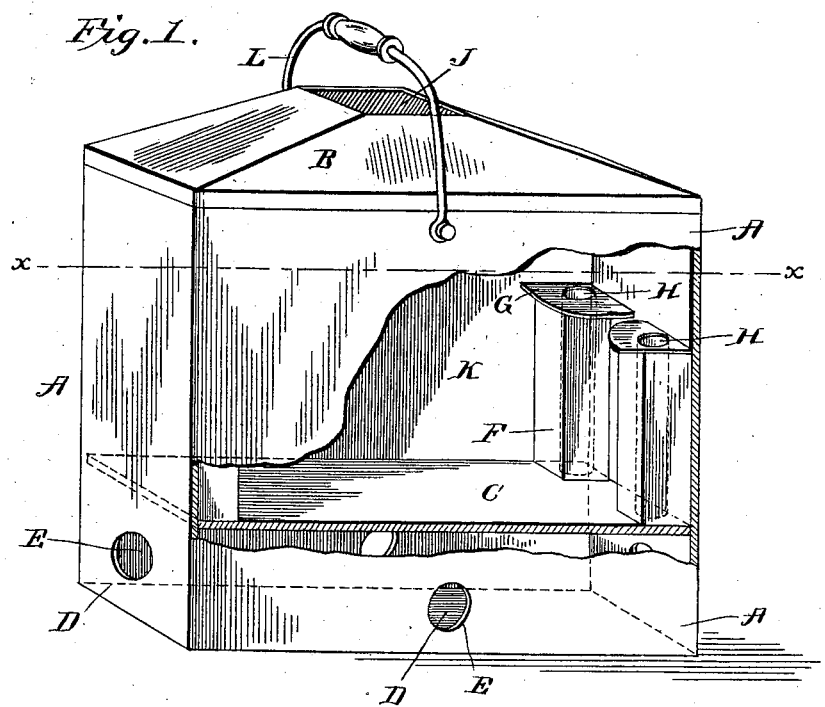
Figure 2:
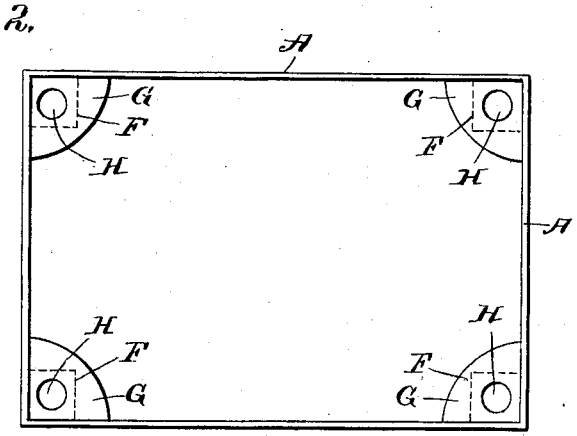

Figure 1 is a perspective of a trap embodying my invention with a portion of one side removed to exhibit the internal arrangement thereof. Fig. 2 is a horizontal cross-section in the line $x$ $x$ of Fig. 1.

Similar letters indicate the same parts in both views.

A is a substantially square box provided with a lid B and an intermediate bottom C. The lower bottom D (shown in dotted lines in Fig. 1) extends over and entirely closes the bottom of the box A. The bottom D is not indispensable, but it serves the desirable function of stiffening and holding the sides and ends of the box A, and when covered with chaff or bran is rather more alluring to the rats than the bare ground or the ordinary floor. The upper bottom C is suitably held about three inches above the bottom D by being attached to the sides and ends of the box A on the inside of the latter. Openings E of such size and number as may be desired are formed in the sides and ends of the box A below the bottom C, so as to admit the rats to the space beneath said bottom C. One or more hollow vertical tubes F are seated in the inner angles of the box A and are surmounted at their upper ends, respectively, with metallic platforms G. The opening H of the tube F is continued through the cap G. The lid B has a central opening J for convenience in removing the rats. The tubes F are preferably made of wood, sections of pump-stock being utilized to facilitate the passage of the rats up the interior of said tube; but all of said tube exposed to the interior chamber K of the box A is covered with sheet metal of some sort, and the same is true of all of the interior of the box A as high as the plane of the platforms G, including the bottom C, and is also true of the lid B. The bail L is attached as a mere matter of convenience in handling the trap and in emptying its contents.

The operation of my invention is as follows: The rats enter the space below the bottom C through the openings E. This space is about three inches in height for a rat-trap, so that the rats can freely circulate therein and at the same time enter the bottom of the opening H in the tubes F, which said opening extends to the lower surface of the bottom C. The rat then passes up the tube F and out upon the platform G, from which it jumps down upon upon the bottom C. The distance from the bottom C to the platform G is about twelve inches, a distance too great for a rat to jump back upon said platform. The sides and bottom of the chamber K being lined with tin or other suitable sheet metal and the exterior of tubes F similarly provided, it is impossible for the rats to crawl up the walls or tubes so as to return through the platform G and tube F. The platforms G extend horizontally some distance beyond the tubes F, so that if a rat should succeed in crawling up the tube F to the under side of the platform G the latter will obstruct its further progress. The platform G being made of any suitable sheet metal, it is impossible for the rats to crawl along the under side of it in order to reach the edge thereof. There is no noise caused by the operation of the machine, and the rats will collect in large numbers on the bottom C. Bait of some sort may be used on the bottom C to attract the rats, and it would be well to scatter such light material as chaff, bran, or oats over the upper side of the bottom C, so as to make a slippery foundation for the feet of the rats when they undertake to jump to the platform G. After a sufficient number of rats has been entrapped the trap A may be submerged in water, either in an inverted position or otherwise, the rats drowned, and then thrown out through the opening J. The trap is equally adapted to catch mice, the parts being reduced in size.

The advantages of my invention are that the trap requires no special setting, that it is noiseless in its operation, that there is no limitation to the number of rats which may be caught at one time except the capacity of the inner chamber K, and that it is easily and cheaply made and of a durable character.

What I claim as my invention, and desire to secure by Letters Patent of the United States, is—

1. The box A provided with the elevated bottom C and vertical tubes F communicating through the said bottom with the interior of said box and surmounted with a platform G, substantially as shown and for the purpose described.

2. In a trap, the combination of a box or inclosure A, a bottom C seated therein a slight distance from the base thereof, openings E formed in said box below the said bottom, one or more tubes F seated vertically on the bottom C and communicating through the latter with the space beneath said bottom and the whole having a metallic lining, substantially as shown and for the purpose described.

In testimony whereof I affix my signature in presence of two witnesses.

OLEY P. HILL.

Witnesses:
CHAS. H. WOODBURN,
JOHN G. MANAHAN.